Dec. 22, 1942.  C. DORNIER  2,306,015

WING STRUCTURE FOR AIRCRAFT

Filed March 20, 1939   3 Sheets-Sheet 1

INVENTOR.
CLAUDE DORNIER.
BY Karl B. Mayr
ATTORNEY.

Dec. 22, 1942.   C. DORNIER   2,306,015
WING STRUCTURE FOR AIRCRAFT
Filed March 20, 1939   3 Sheets-Sheet 2
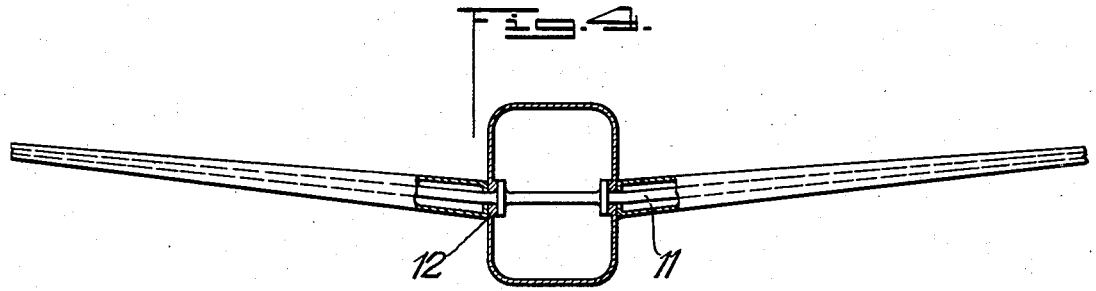
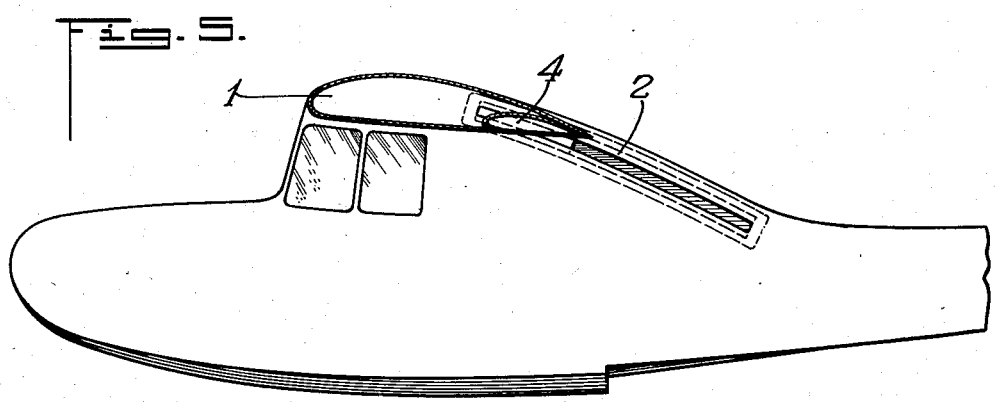
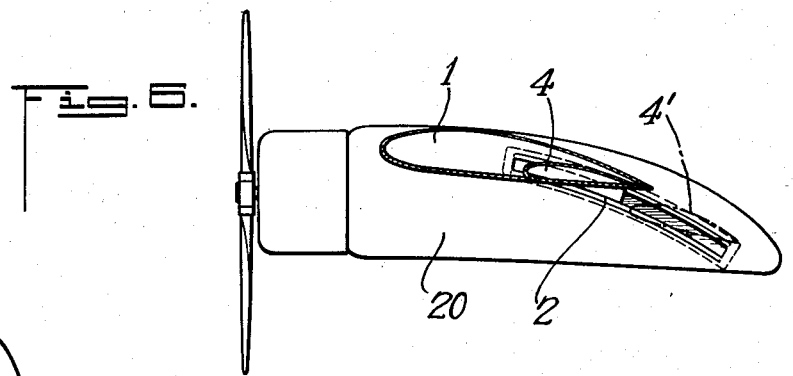
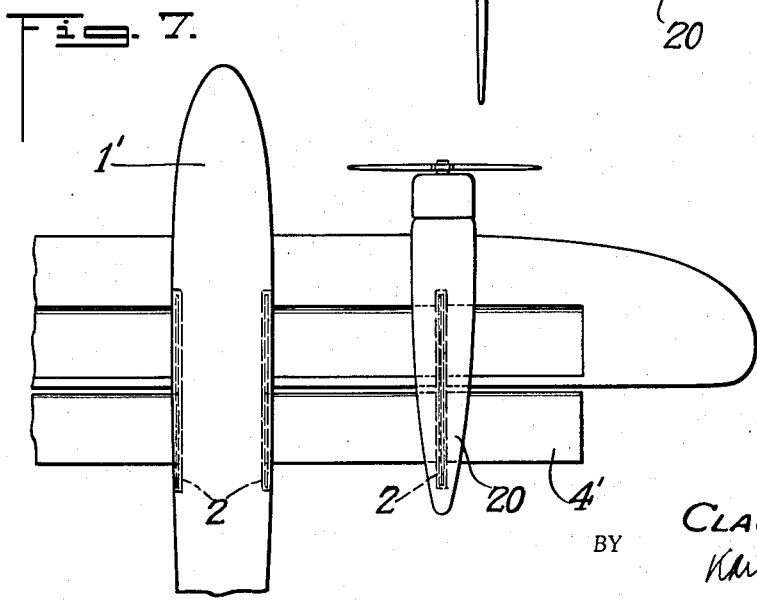
INVENTOR.
CLAUDE DORNIER.
BY Karl A. Mayr
ATTORNEY.

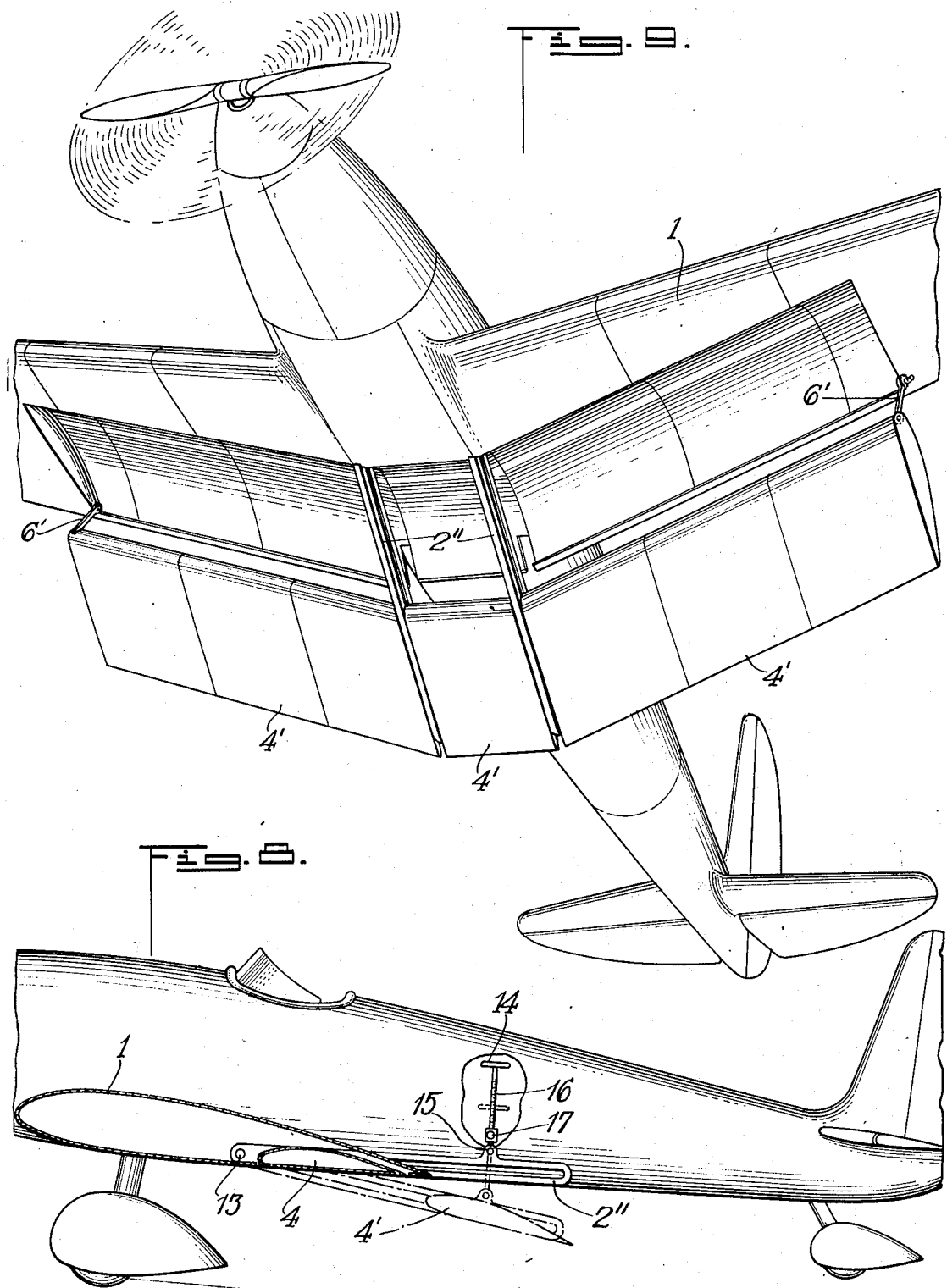

Patented Dec. 22, 1942

2,306,015

UNITED STATES PATENT OFFICE 2,306,015

WING STRUCTURE FOR AIRCRAFT

Claude Dornier, Friedrichshafen-on-the-Bodensee, Germany; vested in the Alien Property Custodian Application March 20, 1939, Serial No. 262,848
In Germany March 25, 1938

8 Claims. (Cl. 244—42)

The present invention relates to an aircraft wing structure having a so-called rolling wing, i. e. an additional wing which, under normal flying conditions, is embedded in a stationary wing and which can be protracted, for example for taking off or landing purposes.

An object of the present invention is the provision of a wing structure of the type set forth in which the additional wing is movable in the direction of flight and which is connected with a stationary wing and with the fuselage of the aircraft.

The additional or auxiliary wing fits into the underside of the main wing so that it supplements the profile of the main wing when in position for high speed flying. The auxiliary wing rests also in a guide provided in the fuselage or the outside thereof and is movable in said guide in the direction of flight. With the structure according to the present invention the major part of the forces due to the air pressure are absorbed by said guide. In order to prevent fluttering the auxiliary wing is also connected in a more or less conventional manner with the main wing by means of one or a plurality of rigid or movable stays or connecting members which, however, in the structure according to the present invention take up only a small part of the forces acting on the wing. The auxiliary wings may also extend through and be supported by the motor gondolas which are connected with the main wing. In such manner use can be made of the rearward extension of said gondolas which extension is provided for aerodynamic reasons but is otherwise not used.

In a preferred embodiment of the present invention connecting members are completely eliminated and the free carrying principle is fully materialized; in such an embodiment the support guide, of course, must be made stronger. Greater stability can be obtained by interconnecting the spars of the individual auxiliary wings and extending said spars through the fuselage or a suitable extension thereof. Such a construction is particularly suitable for high wing and low wing airplanes because in such planes the spars of the auxiliary wings can be located above or below the fuselage and do not interfere with the construction of the interior of the fuselage. The guides for the auxiliary wings may be curved. It is simpler, however, and less expensive to make the guides straight and swingable about their forward ends. For lowering the auxiliary wings the guides are then first swung downward and then the auxiliary wings are moved rearward along the guides.

Further and other objects of the present invention will be hereinafter set forth in the accompanying specification and shown in the drawings which, by way of illustration, show what I now consider to be a preferred embodiment of my invention.

In the drawings:

Figure 4 is a diagrammatic part sectional view of a lateral wing plane according to the present invention.

Figure 5 is a diagrammatic part sectional view of a high wing plane according to the present invention.

Figure 6 is a diagrammatic part sectional view of a motor gondola of an airplane according to the present invention.

Figure 7 is a diagrammatic top view of an airplane according to the present invention.

Figure 8 is a diagrammatic side view of a modified airplane with parts broken away and according to the present invention.

Figure 9 is an isometric bottom view of the airplane shown in Fig. 8.

Like parts are designated by like numerals in all figures of the drawings.

Figure 1:
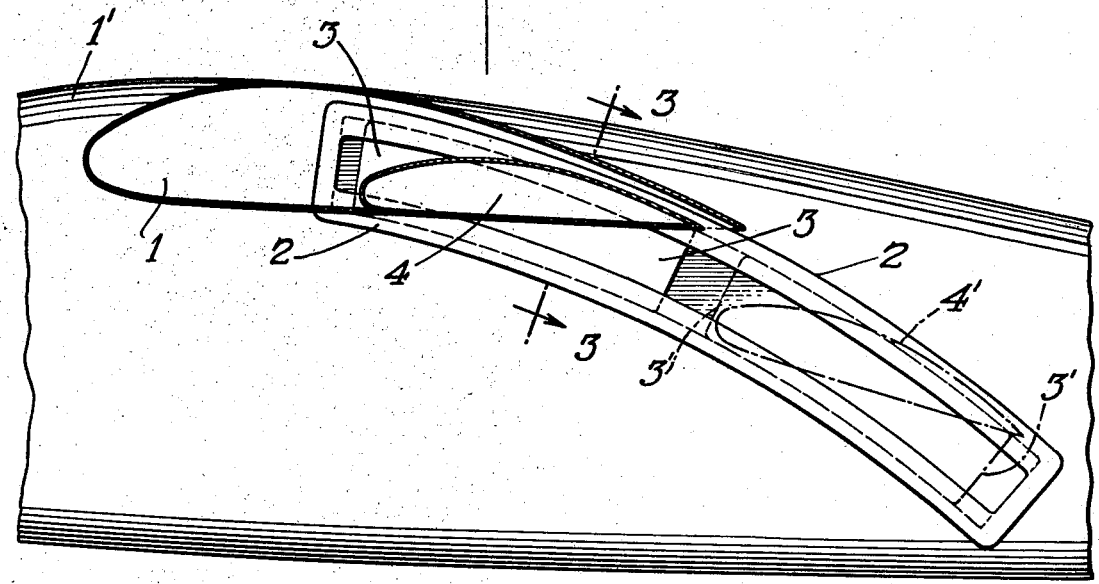
Figure 1 is a diagrammatic part sectional view of a wing structure according to the present invention.

Referring more particularly to Fig. 1 of the drawings numeral 1 designates a normal stationary main wing which is cut through adjacent to its root so that the slot hole guide 2 is visible which is rigidly connected with the outside of the fuselage 1'. In the guide 2 slides the slide member or link block 3 to which a retractable auxiliary wing 4 is rigidly connected. When lowered the auxiliary wing assumes the position 4' which is shown in dash and dotted lines.

Figure 2:
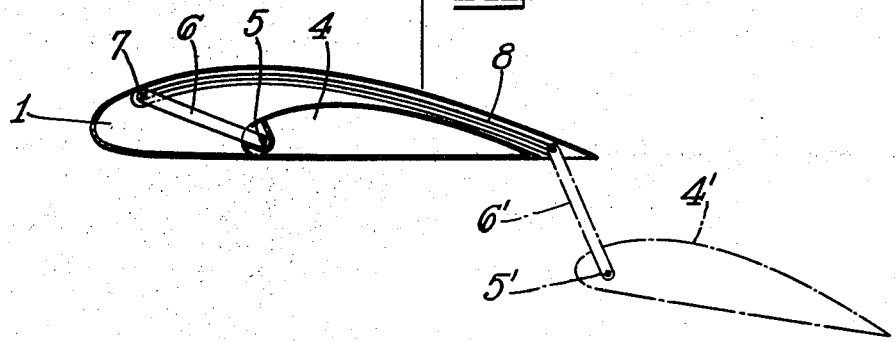
Figure 2 is a diagrammatic sectional view of the wing structure according to Fig. 1, and is taken near the end of a movable wing.

Figure 2 shows a section through the stationary main wing and through the movable auxiliary wing the section being taken near the outer end of the latter. One end of a stay or connecting member 6 is pivoted at 5 to the auxiliary wing 4. The other end of said stay is provided with a slide member 7 which slides in guide 8 which is built into the main wing 1. The positions of the movable parts when the auxiliary wing is lowered are shown in dash and dotted lines, stay 6 being in position 6', fulcrum 5 in position 5' and wing 4 in position 4'.

Figure 3:
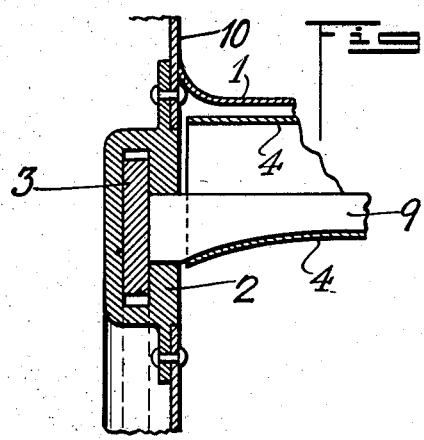
Figure 3 is a sectional view taken along line 3—3 in Fig. 1.

Figure 3 is a section taken along line 3—3 in Fig. 1 and shows the support of the auxiliary wing. Spar 9 of wing 4 is rigidly connected with the slide member 3. Guide 2 is rigidly connected by means of rivets, bolts or the like with the exterior wall 10 of the fuselage and forms together with member 3 a cantilever support for auxiliary wing 4.

Figure 4 shows the application of the present invention to a lateral wing plane whereby the guides simply consist of reinforcements 12 on the lateral wall of the fuselage and the spar 11 of the auxiliary wings extends through the fuselage.

Figure 5 shows the application of the present invention to a high wing plane. In this case a continuous auxiliary wing 4 can be used because the wing does not interfere with the interior construction of the fuselage.

Figures 6 and 7 show the arrangement of guides 2 in the extension of a motor gondola or nacelle 20 as well as in the fuselage 1'. These figures are self-explanatory.

Figures 8 and 9 show the application of the present invention to a low wing plane. Straight guide members 2" are used in this embodiment of the invention. The fore ends of the members 2" are hinged at 13 to the fuselage and can be swung downward by means of a mechanism consisting of a threaded spindle 16 having a hand wheel 14 and being swingably connected with the guide member 2" by means of a pivot 15. Spindle 16 extends through nut member 17 which is rotatably connected with the fuselage. Figure 9 is a bottom view of an airplane as per Fig. 8 whereby the rolling or auxiliary wings 4 are lowered along the lowered guides 2". Suspending stays 6 are provided of the type shown in Fig. 2. Between the swingable slot hold guide means 2" an auxiliary wing portion is provided which is adapted to be faired under the fuselage to form a continuous undersurface thereof when in retracted position.

While I believe the above described embodiments of my invention to be preferred embodiments, I wish it to be understood that I do not desire to be limited to the exact details of design and construction shown and described, for obvious modifications will occur to a person skilled in the art.

I claim:

1. In an aircraft having a fuselage, an aerofoil including a cambered main wing consisting of a main portion and a trailing portion, and an auxiliary wing adapted to be faired under the trailing portion of said main wing and to be projected rearwardly and downwardly in parallel relation to said main wing, connecting means provided at the end of said auxiliary wing adjacent to said fuselage, support means provided in said fuselage and movably connected with said connecting means and forming therewith a cantilever support for said auxiliary wing.

2. In an aircraft having a fuselage, an aerofoil including a cambered main wing consisting of a main portion and a trailing portion, and an auxiliary wing adapted to be faired under the trailing portion of said main wing and to be projected rearwardly and downwardly in parallel relation to said main wing, link-block means provided at the end of said auxiliary wing adjacent to said fuselage, support means provided in said fuselage and comprising a slot hole slidingly accommodating said link block means and forming therewith a cantilever support for said auxiliary wing.

3. In an aircraft having a fuselage, an aerofoil including a cambered main wing consisting of a main portion and a trailing portion, and an auxiliary wing adapted to be faired under the trailing portion of said main wing and to be projected rearwardly and downwardly in parallel relation to said main wing, connecting means provided at the end of said auxiliary wing adjacent to said fuselage, support means swingably connected with said fuselage and adapted to swing about an axis substantially parallel to the longitudinal axis of said aerofoil and movably connected with said connecting means and cantileverlike supporting said auxiliary wing.

4. In an aircraft having a fuselage, an aerofoil including a cambered main wing consisting of a main portion and a trailing portion, and an auxiliary wing adapted to be faired under the trailing portion of said main wing and to be projected rearwardly and downwardly in parallel relation to said main wing, link-block means provided at the end of said auxiliary wing adjacent to said fuselage, support means swingably connected with said fuselage and comprising a slot hole slidingly accommodating said link block means and cantileverlike supporting said auxiliary wing.

5. In an aircraft having a fuselage, two aerofoils each including a cambered main wing consisting of a main portion and a trailing portion, two auxiliary wings adapted to be faired individually under the trailing portions of said main wings and to be projected rearwardly and downwardly in parallel relation to said wing, connecting means rigidly connected to and interconnecting said auxiliary wings, other connecting means rigidly connected with the ends of said auxiliary wings adjacent to said fuselage, and support means provided on said fuselage and movably connected with said other connecting means and forming therewith a cantilever support for said auxiliary wings.

6. In an aircraft having a fuselage, two aerofoils each including a cambered main wing consisting of a main portion and a trailing portion, two auxiliary wings adapted to be faired individually under the trailing portions of said main wings and to be projected rearwardly and downwardly in parallel relation to said wing, connecting means rigidly connected to and interconnecting said auxiliary wings, slide means rigidly connected with said connecting means adjacent to said fuselage, and support means provided on said fuselage and slidingly connected with said slide means and forming therewith a cantilever support for said auxiliary wings.

7. In an aircraft having a fuselage, two aerofoils each including a cambered main wing consisting of a main portion and a trailing portion, two auxiliary wings adapted to be faired individually under the trailing portions of said main wings and to be projected rearwardly and downwardly in parallel relation to said wing, connecting means rigidly connected to and interconnecting said auxiliary wings and including an auxiliary wing portion adapted to be faired under said fuselage, other connecting means rigidly connected with the ends of said auxiliary wings adjacent to said fuselage, and support means provided on said fuselage and movably connected with said other connecting means and forming therewith a cantilever support for said auxiliary wings.

8. In an aircraft having a fuselage, an aerofoil including two main wings comprising each a main portion and a trailing portion, and auxiliary wings adapted to be faired individually under the trailing portions of said main wings and to be projected rearwardly and downwardly in parallel relation to said main wings, each of said auxiliary wings having a root portion, connecting means provided at said root portions, support means swingably connected with said fuselage and adapted to swing about an axis parallel to the longitudinal axis of said aerofoil and movably connected with said connecting means and cantileverlike supporting said auxiliary wing, and an auxiliary wing portion rigidly connected with said auxiliary wings and disposed between said support means and adapted to be faired under said fuselage.

CLAUDE DORNIER.